United States Patent
Götz et al.

(10) Patent No.: US 11,262,722 B2
(45) Date of Patent: Mar. 1, 2022

(54) MONITORING AND CONTROLLING UNIT FOR USE IN AN AUTONOMOUS SYSTEM WITH SELF-X PROPERTIES

(71) Applicant: Siemens Aktiengesellschaft, Munich (DE)

(72) Inventors: Helmut Götz, Nuremberg (DE); Ivan Tritchkov, Erlangen (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 46 days.

(21) Appl. No.: 16/321,954

(22) PCT Filed: Aug. 2, 2016

(86) PCT No.: PCT/EP2016/068434
§ 371 (c)(1),
(2) Date: Jan. 30, 2019

(87) PCT Pub. No.: WO2018/024321
PCT Pub. Date: Feb. 8, 2018

(65) Prior Publication Data
US 2019/0179282 A1 Jun. 13, 2019

(51) Int. Cl.
*G06F 9/44* (2018.01)
*G06F 9/445* (2018.01)
(Continued)

(52) U.S. Cl.
CPC .......... *G05B 19/0428* (2013.01); *G06F 11/22* (2013.01); *G05B 2219/23456* (2013.01);
(Continued)

(58) Field of Classification Search
CPC ...... G05B 19/0428; G05B 2219/23456; G05B 2219/24015; G05B 2219/24054; G06F 11/22
See application file for complete search history.

(56) References Cited

U.S. PATENT DOCUMENTS

| 9,003,390 | B2 * | 4/2015 | Moritzen | G06F 8/65 717/171 |
| 2005/0188289 | A1 * | 8/2005 | Berndlmaier | G01R 31/31718 714/733 |

(Continued)

FOREIGN PATENT DOCUMENTS

| CN | 102323985 A | 1/2012 |
| WO | 2014128132 A1 | 8/2014 |

OTHER PUBLICATIONS

Marco Jacobi, A Tool chain for AUV system testing, 2010, pp. 1-5. https://ieeexplore.ieee.org/abstract/document/5603626 (Year: 2010).*
(Continued)

*Primary Examiner* — Mongbao Nguyen
(74) *Attorney, Agent, or Firm* — Schmeiser, Olsen & Watts, LLP

(57) ABSTRACT

Provided is a monitoring and controlling unit for use in an autonomous system with self-X properties, including a test data interface for receiving test data, a real data interface for receiving real data, wherein the test data is compared with the real data to determine whether there is a part of new data in the real data, if a part of new data is identified in the real data, the test data is updated with the part of new data and an output interface for sending the updated test data, which can be further processed into at least one executable test. Further, provided is an according autonomous device, an autonomous system, method of self-testing of an autonomous system and computer program.

10 Claims, 1 Drawing Sheet

(51) Int. Cl.
  *G05B 19/042* (2006.01)
  *G06F 11/22* (2006.01)
(52) U.S. Cl.
  CPC .............. *G05B 2219/24015* (2013.01); *G05B 2219/24054* (2013.01)

(56) References Cited

U.S. PATENT DOCUMENTS

| | | | |
|---|---|---|---|
| 2009/0113049 A1* | 4/2009 | Nasle | G05B 19/0428 709/224 |
| 2009/0240759 A1 | 9/2009 | Miyamoto et al. | |
| 2013/0086573 A1* | 4/2013 | Moritzen | G06F 8/65 717/171 |
| 2013/0176970 A1* | 7/2013 | Terry | H04W 72/042 370/329 |
| 2014/0068563 A1* | 3/2014 | Saltzman | G06F 21/52 717/124 |
| 2014/0237450 A1* | 8/2014 | Levy | G06F 11/3684 717/124 |
| 2014/0316640 A1* | 10/2014 | Dippl | G06Q 10/06 701/33.4 |
| 2015/0161894 A1* | 6/2015 | Duncan | G06K 9/00845 701/1 |
| 2015/0200533 A1* | 7/2015 | Simonin | H02H 3/05 335/17 |
| 2015/0241856 A1* | 8/2015 | Walser | F24F 11/30 700/275 |
| 2016/0063870 A1* | 3/2016 | Scheldt | G01R 31/00 701/3 |
| 2016/0210383 A1* | 7/2016 | Alaniz | G06F 30/20 |
| 2016/0246838 A1* | 8/2016 | Li | G06F 11/3684 |
| 2016/0359664 A1* | 12/2016 | Malegaonkar | G06F 8/34 |
| 2016/0364308 A1* | 12/2016 | Shanbhogue | G06F 11/2635 |
| 2017/0050590 A1* | 2/2017 | List | G01M 17/007 |
| 2017/0139411 A1* | 5/2017 | Hartung | G05D 1/0077 |
| 2017/0228279 A1* | 8/2017 | Mariani | G06F 11/008 |
| 2017/0243083 A1* | 8/2017 | Wang | G06K 9/6262 |
| 2018/0136651 A1* | 5/2018 | Levinson | G05D 1/0027 |
| 2018/0286510 A1* | 10/2018 | Kwan | G06Q 30/0633 |
| 2019/0179282 A1 | 6/2019 | Helmut et al. | |

OTHER PUBLICATIONS

Peter Els, The Virtual Reality of Testing Self-Driving Cars, Jul. 2016, pp. 1-5. https://www.automotive-iq.com/autonomous-drive/articles/virtual-reality-testing-self-driving-cars (Year: 2016).*

Chi Zhang, RoadView: A Traffic Scene Simulator for Autonomous Vehicle Simulation Testing, 2014, pp. 1160-1165. https://ieeexplore.ieee.org/document/6957844 (Year: 2014).*

Alexander Inzartsev, Application of Artificial Intelligence Techniques for Fault Diagnostics of Autonomous Underwater, Jul. 2016, pp. 1-6. https://ieeexplore.ieee.org/stamp/stamp.jsp?tp=&arnumber=7761098&isnumber=7760990 (Year: 2016).*

Huang Wenling, Automatic Test System for Attitude Control System of AUV, 2009, pp. 227-231. https://ieeexplore.ieee.org/stamp/stamp.jsp?tp=&arnumber=5234960&isnumber=5234374 (Year: 2009).*

Neerja Gupta, Architecture of Autonomous Vehicle Simulation and Control Framework, 2015, pp. 1-6. https://dl.acm.org/doi/pdf/10.1145/2783449.2783515 (Year: 2015).*

PCT International Search Report and Written Opinion of International Searching Authority dated Mar. 31, 2017 corresponding to PCT International Application No. PCT/EP2016/068434 filed Aug. 2, 2016.

Prasanna M. et al: "A Survey On Automatic Test Case Generation"; Internet Citation; Jan. 1, 2005 (Jan. 1, 2005), pp. 1-7, XP002577590.

Gepperth, Alexander et al: "Incremental learning algorithms and applications"; European Symposium on Artificial Neural Networks (ESANN); Jan. 1, 2016 (Jan. 1, 2016), p. 1418129, XP055537333.

* cited by examiner

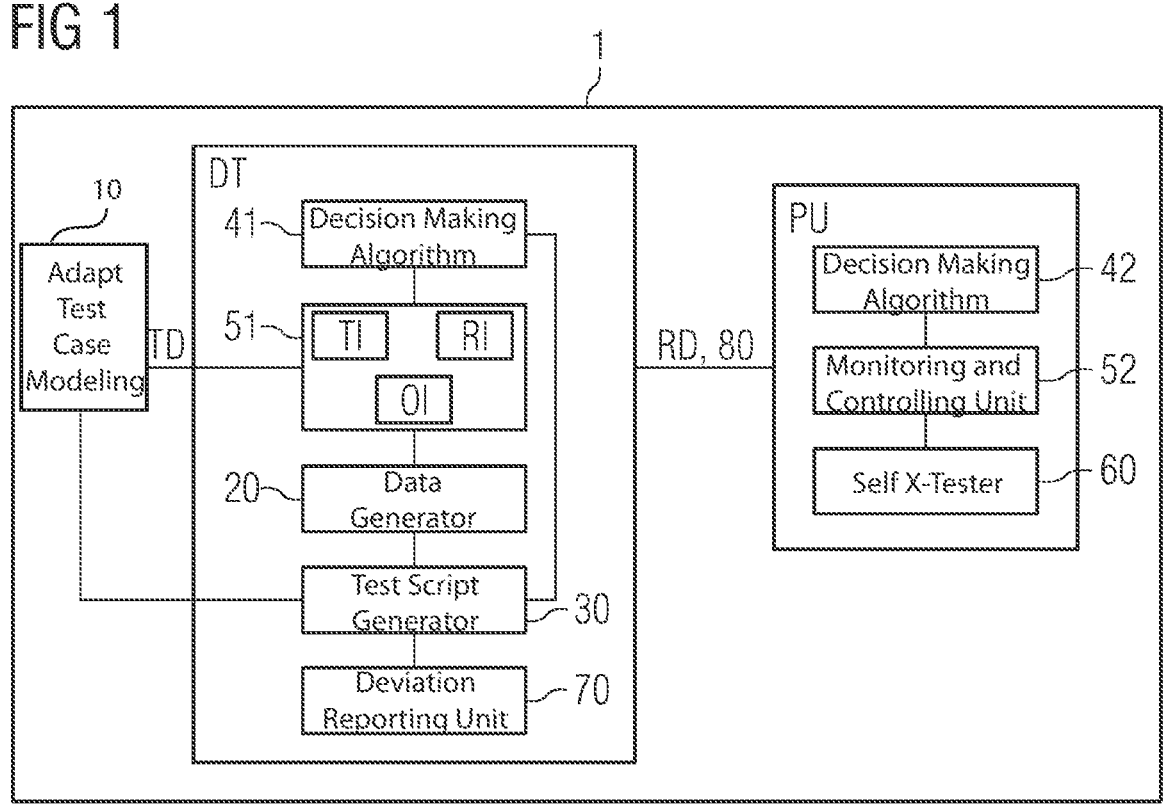
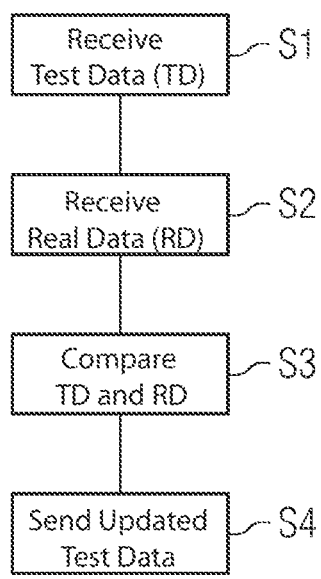

MONITORING AND CONTROLLING UNIT FOR USE IN AN AUTONOMOUS SYSTEM WITH SELF-X PROPERTIES

CROSS-REFERENCE TO RELATED APPLICATIONS

This application claims priority to PCT Application No. PCT/EP2016/068434, having a filing date of Aug. 2, 2016, the entire contents of which are hereby incorporated by reference.

FIELD OF TECHNOLOGY

The following relates to a monitoring and controlling unit for use in an autonomous system, an autonomous means or device for use in an autonomous system, a corresponding autonomous system with self-X properties and a corresponding method of self-testing of an autonomous system.

BACKGROUND

The complexity of software systems is constantly increasing in the last decades and as a result they become more flexible, configurable, customizable and versatile. For this reason there is an increasing demand for technical systems, which can respond in an adequate way to the unpredictable environmental changes and to the rapid data stream of sometimes conflicting demands. Such technical systems will play a key role in the next years.

There are several definitions in the literature for such technical systems, for example autonomic systems, autonomous systems, organic systems, self-managing systems or self-adaptive systems. For example, the autonomous systems can be equipped with sensors and actuators. Thus, the autonomous systems are capable to be aware of their environment, can communicate freely, and can organize themselves in order to perform the actions and services that seem to be required. Further, the autonomous systems are characterized by self-x properties (also known as self-* in the English literature), including: self-organization, self-configuration, self-optimization, self-healing, self-protection, self-explaining, self-adapting, self-learning etc. For example, robots, robotic vehicles, smart factories smart grids, other smart machines and devices can be designed as autonomous systems. These are well known examples in the technical fields of Industry 4.0, Digital Factory and Process Automation.

Those skilled in the art will appreciate that software testing of autonomous systems is a complex and difficult task. Software testing is known from the known art as a process of executing a program or application with the intent of finding errors in the software. Therefore, software testing can be also stated as the process of validating and verifying that a software program or application meets the technical and business goals, fulfills the requirements and works as expected. As a result, the quality of the tested software can be improved and the risk of fatal errors can be significantly minimized.

As outlined further below, the autonomous system is characterized by open system structure and decision-making capabilities. This means that the autonomous system can make adequate decisions at run-time based on its current needs and according to the environmental conditions. Because of the flexible system configuration, the unpredictable changes and the non-deterministic system behavior, in known techniques the behavior of the self-X properties of the autonomous system cannot be validated and their correctness is not guaranteed. Accordingly, the vendor or the provider of the autonomous system also cannot ensure that it works as expected under given operational or environmental conditions.

The lack of the essential software testing or validation leads to severe consequences and errors. Besides the drawbacks, such as loss of money or huge image damage, errors in factories' production process can arise.

The complete lack of software testing, insufficient or incorrect software testing and validation of the autonomous systems can be traced to some of the following reasons.

The lack of realistic environment and operation test data is one major reason. To test the self-X properties of the autonomous system one needs to specify proper input data, which is used during test execution to provoke a certain system behavior. However, the set of input parameters usually consists not only of workflow-related test data, but also of data coming from the peers interacting with the software under test and test data representing the environmental conditions ("outside" the system).

As outlined above, in more detail, the system structure of the autonomous system is flexible allowing changes in the system configuration at any time and the autonomous system may come at customer site into existence in unforeseen configurations. More generally, any system configuration is possible. Accordingly, the art, the number and the state of the interacting peers can change before, after or even during operation. This makes it really difficult for test engineers to design realistic, complete and comprehensive test data, whose amount remains in the same time manageable and allows exhaustive testing. In addition, the environment conditions and any disturbances should be considered, which might occur at operation time. However, these further conditions are not known at engineering time, when the system is designed and developed.

As a result, the known technologies do not allow software testing or validating the correct system behavior for any possible combination of workflow-specific test data, environment test data and disturbance factors.

The lack of predictable results is a further reason. A predictable output is important in software testing and the test process because it helps to distinguish between correct and incorrect behavior. In the traditional software engineering the output of a system depends only on its input, whose range is mostly predictable. The system makes based on the input pre-defined decisions to achieve a certain goal. In this way, it is sufficient for testers to know the input in order to be able to determine if a certain behavior is correct or not. However, as mentioned further above, the behavior of the autonomous system depends not only on the set of input parameters, but also on the environment conditions and disturbances. To fulfill these requirements the autonomous system has the ability to change and optimize its behavior at run-time. The combination of unpredictable environment conditions, the broad variety of mostly unknown disturbances that may happen, the wide range of input parameters and the flexible system behavior makes it very difficult to predict the system behavior and its output at any time. Accordingly, it cannot be ensured whether a certain system behavior is correct or not on the basis of unknown results. Further, the system might react in a different way in one situation or the same situations. This is intentional and is "caused" by the machine learning algorithms, which help the system to optimize its behavior and its results over the time.

The task software testing in the context of autonomous system is just merely addressed in literature so far. One known exemplary approach for software testing and particular behavior validation is known under the term control-oriented system architecture called Corridor Enforcing Infrastructure (CEI). The correct system behavior is considered as a corridor in this approach. Every deviation out of this corridor should be monitored and identified by the system architecture. Having identified a deviation, the system behavior should be forced back to the corridor. A disadvantage of this approach is that, it is still unknown how the corridor could be used for the validation and verification of the system behavior. Even if an error occurs and the system leaves its corridor, it's not obvious what caused that deviation and where is the root cause.

It is therefore an objective of embodiments of the invention to provide a monitoring and controlling unit for use in an autonomous system with self-X properties in such a manner that the system behavior of the autonomous system is correct although the conditions for testing are unpredictable, changeable and non-deterministic.

SUMMARY

This problem is according to one aspect of embodiments of the invention solved by a monitoring and controlling unit for use in an autonomous system with self-X properties, comprising:
a. a test data interface for receiving test data;
b. a real data interface for receiving real data;
c. wherein the test data is compared with the real data to determine whether there is a part of new data in the real data;
  if a part of new data is identified in the real data, the test data is updated with the part of new data;
d. an output interface for sending the updated test data, which can be further processed into at least one executable test.

The autonomous system can be equipped with specific components, such as sensors and actuators, for monitoring their environment and performing any desired actions. Accordingly, the autonomous system can organize itself to a great extent and can be characterized by self-X properties. More particularly, the present autonomous system comprises self-testing as a self-X property. Thus, in this case, the autonomous system does not need any external or separate testing component for testing the autonomous system. To the contrary, the autonomous system with self-X properties is capable of testing its system behavior itself.

Accordingly, initial test data is generated and processed into executable tests for testing the autonomous system during engineering phase or realization. Further, the autonomous system operates in an operational mode in an operational phase after being tested.

Accordingly, a monitoring and controlling unit for use in an autonomous system with self-X properties receives both test data from the virtual world and real data from the real world. Further, the first monitoring and controlling unit evaluates the two received data sets. More particularly, the two received data sets are compared with each other. If a part of new data is identified in the real data, the test data is updated with the part of new data. Then, the updated test data is used for the generation of one or more new executable tests. Accordingly, the previous or already stored test data is extended or corrected as an example.

This way, embodiments of the present invention allows the generation of executable tests, which cover all essential and complete information about the possible and realistic system behavior of the autonomous system and thus improves the validation of the autonomous system.

According to an embodiment, at least two of the data interfaces, the real data interface or the output interface, are combined into one interface. The monitoring and controlling unit receives two distinct data sets, as mentioned above. Therefore the monitoring and controlling unit can comprise one common interface or a plurality of distinct interfaces for receiving and/or sending data sets between the virtual world and the real world.

According to an embodiment, the test data is based on at least one external or internal input parameter, wherein at least one input parameter can be selected from the group, comprising: system environment, system requirement, system status, system component, interaction with system components. System engineers generate test data in the engineering phase on the basis of all possible worst-case scenarios and thus events which might occur in the real world outside the autonomous system or inside the autonomous system. This way, fatal errors can be avoided in the real world, as noted in the introductory part of embodiments of the present invention by improving the test data and executable tests.

According to an embodiment, the real data interface receives the real data from a second monitoring and controlling unit collecting the real data from the real world. Thereby, the second monitoring and controlling unit is placed on the real, physical hardware equipment, as outlined further below. This way, the test data sets are not solely based on expectations or the worst cases which might occur, but are also completed, extended or corrected based on real input parameters.

The embodiment is also directed to an autonomous means or device for use in an autonomous system with self-X properties, comprising a monitoring and controlling unit.

The embodiment is also directed to an autonomous system with self-X properties, comprising:
a. a first autonomous means or device in the virtual world with a first monitoring and controlling unit for evaluating test data;
b. a second autonomous means or device in the real world with a second monitoring and controlling unit for collecting real data and for sending the real data to the first autonomous means or device in the virtual world.

As explained further above, the autonomous system comprises in one aspect of embodiments of the invention two distinct autonomous means with respective monitoring and controlling units. Thereby, the first monitoring and controlling unit of the virtual world receives test data from the virtual world and real data from the second monitoring and controlling unit and thus real world for data evaluation. Thus, the two monitoring and controlling units functionally interact with each other for generating test data. Thereby, the test data advantageously aims to cover all possible environmental conditions which might occur and environmental conditions which indeed occur.

In other words, the coverage is increased over time. The longer the physical unit is in operation, the more real test data is collected and the coverage is increased.

According to an embodiment, the first autonomous means in the virtual world is a digital virtual unit and the second autonomous means is a physical unit in the real world. The second autonomous means is connected and fully synchronized with its digital virtual unit (called digital twin), which is itself connected to the first autonomous means. Thus, the first autonomous means tests the autonomous system in the engineering phase i.e. not in the real world. The second autonomous means operates in the operational phase in the real world. Accordingly, the autonomous system makes decisions or performs functions dependent on the current system behavior and environmental conditions.

According to an embodiment, the first autonomous means and the second autonomous means are connected by a communication channel for exchanging the test data and/or the real data. Accordingly, the first autonomous means and the second autonomous means can exchange data through any kind of communication channel, which allows for a flexible and efficient data transfer. Additionally or alternatively the data can be stored within the autonomous means, other components of the autonomous system in one or more non-volatile data storages, volatile data storages and/or clouds.

According to an embodiment, the first autonomous means further comprises at least one processing unit suitable for the interpretation of dynamic classification trees. The updated test data can be further processed in one or more processing steps by respective one or more processing units before being executed. Therefore, for example the test data can be defined in a form of dynamic classification tree by a data generator to generate test data combinations. The test data combinations can be further used by a test script generator to generate one or more executable tests. The use of dynamic classification trees are proved to be particularly advantageous since not solely static test data, but other test data, such as interaction peer test data and environment test data can be added to the existing classification trees. This is necessary since the environmental conditions can change over time.

According to an embodiment, the first autonomous means further comprises a deviation reporting unit for reporting at least one deviation in the autonomous system, wherein the at least one deviation is detected if a part of new data is identified by the first monitoring and controlling unit. As previously explained, the monitoring and controlling unit compares the test data with the real data. If a part of new data is identified, and hence the calculated real data deviates from the expected test data one or more deviations occurred. These deviations are reported. Thus, the previously generated executable test failed and the generation of the executable test has to be repeated and the test executed until no further deviation occurs. For example, thus, the deviations can be reported to other neighboring autonomous systems in the very beginning and further measures can be initiated.

According to an embodiment, the second autonomous means further comprises a built-in self x-tester for executing tests on its own. As previously explained, the executable tests of the first autonomous means are performed in the engineering phase i.e. not in the operational mode. However, additionally or alternatively the second autonomous means in the real world can comprise a self-x tester for testing its system functionalities e.g. while in an idle or standby mode. Thus, the present embodiment ensures that the tests are meaningful and the autonomous system is correctly and efficiently validated.

Embodiments of the invention is also directed to a method of self-testing of an autonomous system, comprising the steps of:
a. receiving test data by a test data interface of a first monitoring and controlling unit;
b. receiving real data by a real data interface of the first monitoring and controlling unit;
c. comparing the test data with the real data to determine whether there is a part of new data in the real data by the first monitoring and controlling unit;
   if a part of new data is identified in the real data, the test data is updated with the part of new data;
d. sending the updated test data by an output interface of the first monitoring and controlling unit, which can be further processed into at least one executable test.

Lastly, the present embodiment also provides a computer program comprising instructions for implementing any of the above described methods or a computer program product, comprising a computer readable hardware storage device having computer readable program code stored therein, said program code executable by a processor of a computer system to implement a method.

BRIEF DESCRIPTION

Some of the embodiments will be described in detail, with reference to the following figures, wherein like designations denote like members, wherein:

FIG. 1 shows a schematic representation of a simplified autonomous system; and

FIG. 2 shows a flow chart for self-testing the autonomous system in accordance with the invention.

DETAILED DESCRIPTION

Self-Testing of Autonomous Systems

FIG. 1 illustrates the test architecture for testing the autonomous system 1 with self-X properties. The test architecture can be divided into two parts and associated phases. The left part of FIG. 1 is assigned to the both engineering operational phase, while the right part of FIG. 1 is assigned solely to the operational phase. In the engineering phase the autonomous system is designed, implemented and simulated. Each physical unit PU from the real world has his virtual representative, which is usually called digital twin DT. Thereby, the digital twin DT is fully synchronized with the physical unit PU, maps its current state and holds all the information, which describes it. Further, the digital twin DT and the physical unit PU are connected through a communication channel 80. The communication channel 80 can be implemented as WLAN or LAN etc. and information can be exchanged through the communication channel directly or using MES (e.g. MES=manufacturing execution system) as a proxy. Additionally or alternatively the exchanged data can be stored in a cloud or other type of storage. In the operational phase the autonomous system 1 operates in operating or working mode and fulfills its goals.

As mentioned above, there are two reasons or technical issues causing the incorrectness of software testing: 1) lack of realistic environment and operation test data and 2) lack of predictable results. These issues are addressed in embodiments of the present invention and overcome by performing the method steps S1 to S4 according to embodiments of the invention, as will be explained in the following with respect to FIG. 1 and FIG. 2.

Therefore, the autonomous means PU, test agent TA each comprise a plurality of system components which fulfill respective functions and interact with each other in a functional manner. According to an embodiment, each autonomous means PU, TA comprises a monitoring and controlling unit 51, 52.

Monitoring and Controlling Units of the Test Agent TA and Physical Unit PU

According to an embodiment, the monitoring and controlling units 51, 52 differ in their sub units for performing a respective function. The sub units are not illustrated in FIG. 1 for simplification.

For example, a first monitoring and controlling unit 51 of the test agent TA comprises a Test Data Evaluator as a sub unit for data comparison and evaluation. The Test Data Evaluator can determine if incoming data, especially real data RD has already been recorded and the current test data TD is updated. It can also compare the results of the self-X algorithms of PU (part of the real data RD) with the one corresponding to them in the existing test data. To the contrary, the second monitoring and controlling unit 52 of the physical unit PU comprises for example a Test Data Collector for data collection. The Test Data Collector can collect e.g. record and send the real data (both input and output data) from the second monitoring and controlling unit 52 to the first monitoring and controlling unit 51 for further data comparison.

Further System Units of the Test Agent TA

The Adapt Test Case Modeling 10 of the TA is a UML extension. It is a modeling approach that allows the explicit modeling of adaptivity, "enabling adaptivity to gather attention early in the software engineering process". The test generation based on UML models is nowadays one of the most established methods for test specification and can be used in embodiments of the present invention to model adaptive system behavior.

The deviation reporting unit 70 of the TA can also be called "deviation broadcaster" and can be used to broadcast to the other interacting peers and to any other relevant units i.e. MES system any known or found errors or bugs. This allows other system units participating in the production process to react better and to adapt their behavior accordingly in case of errors in one of their communication and production partners.

The Data Generator 20 of the DT can use the classification tree method as testing technique to generate a combination of test data based on a pre-defined input data space. The data generator and/or further sub units can be incorporated in component, such as test data farm. According to an embodiment, the pre-defined input data space is stored as adaptive classification trees (ACT). Data Generator 20 uses these trees to generate input data. The ACTs consist of a fixed part and adaptive part. The fixed part is defined in the engineering phase and describes a set of known parameters and their expected results. Some of them are derived from the worst-case definition, as explained further above. The adaptive part depicts the current configuration of the AS and a set of data, which was handled by the Decision Making (self-X) Algorithm 41 and evaluated by the monitoring and controlling unit 51. This part of the ACT is dynamic and can be updated by the monitoring and controlling unit 51, if a new combination of data or data pair is identified.

The Test Script Generator 30 of the DT takes as input a behavior description and a set of test data and combines them in a proper way to generate one or more executable tests as output, as explained previously above. The Test Script Generator 30 transmits the executable test to decision making algorithms 41.

Further System Units of the Physical Unit PU

The Self X-Tester 60 of the PU can execute tests on its own in idle phases or during operation. Static test data can be used by the Self X-Tester to validate its behavior based on a pre-defined set of test data combinations derived from the worst-case scenarios. This way, the present embodiment ensures that the basic system functionalities are working and the autonomous system is safe for use.

Self-Testing of an Autonomous System

The functional interplay of the autonomous means with the monitoring and controlling units 51, 52 of the autonomous system with self-X properties will be explained once more in Detail with respect to the FIG. 1.

As already explained, the first issue 1) is overcome by testing the worst possible scenarios on the test agent TA in the engineering phase and extending the test data TD of the engineering phase with real data RD coming from the physical unit PU, which is collected during the operation phase by the physical unit PU.

On the one hand system engineers assume the worst possible scenarios or worst cases to design the possible system behavior of the autonomous system for the generation of test data TD in the engineering phase. This is advantageous since the real system behavior is unknown in the engineering phase and might change in the operational phase. As previously mentioned, the present embodiment tries to fill that lack of information. In known art, the autonomous system is tested on incomplete information and thus the validated autonomous system might make wrong decisions in the operational phase. Further, the generated test data TD is continuously updated with real data RD, which is collected in the operational phase. This is also advantageous since the expected system behavior is adapted to real environmental conditions.

Thereby, the worst cases have to be defined in the engineering phase by the system engineers in the first place. The worst-case scenarios are directed to the most critical scenarios, as well as any other scenarios defined and considered by the system engineers as important. For every worst case scenario one has to create one or more test cases, which describe the scenario workflow and the expected system behavior.

More explicitly, the system behavior for the worst case is modeled, in UML using the UML extension for modeling of adaptive behavior 10 and transmitted to the Test Script Generator 30. Further, respective test data TD is defined by the system engineers, as a static part of the adaptive classification tree and transmitted to the Data Generator 20 of the test agent TA. Then, the Data Generator 20 takes the test data TD as input and generates e.g. automatically the possible test data combinations. The test data combinations are transmitted from the Data Generator 20 to the Test Script Generator 30 of the test agent TA. Accordingly, the Data Generator 20 receives both the test data TD and generates test data combinations. Alternatively or additionally, the Test Script Generator 30 can receive other data. The Test Script Generator 30 takes the received data as input and generates e.g. automatically executable tests, which can be directly executed by passing the relevant data from the Test Script Generator 30 to the Decision Making Algorithms, such as self-X Algorithms 41, 42. The test agent TA comprises one or more additional system components, particularly the monitoring and controlling unit 51, which will be explained in the following in more detail.

Moreover, the physical unit PU comprises a monitoring and controlling unit 52, as well. The monitoring and controlling unit 52 records incoming real-world data RD as input data, such as parameters, environment conditions and any unexpected disturbances influencing the decision making. For this reason, the monitoring and controlling unit 52 comprises a Test Data Collector (not shown). Then, the collected input data sets together with the output data are transmitted as new real-world data RD from the monitoring and controlling unit 52 to the Monitoring and controlling unit 51 of the test agent TA The monitoring and controlling unit 51 comprises a build-in Test Data Evaluator for checking which input-output pairs have already occurred in the past and are already recorded. All new data combinations, such as new input-output pairs are used to extend and update the previous test data (dynamic classification tree) and to generate new test data combinations and executable tests.

Accordingly, in the operational phase new input data, which is collected from the real world, is recorded by the monitoring and controlling unit 52 of the physical unit PU. This so-called real-world data RD is then reused for testing purposes in the virtual world before deploying any new versions of the software on the physical unit PU. Therefore, the monitoring and controlling unit 51 of the test agent AT incorporates or reuses the recorded new real-world data in the stored test data set. Thus, according to an embodiment the method guarantees that all information and changes in the current and realistic environment are incorporated in the test data.

According to an embodiment, the monitoring and controlling unit 51 can comprise one or more of interfaces, such as an input interface for receiving data and/or an output interface for sending data. In FIG. 1, the monitoring and controlling unit 51 comprises a real data interface RI for receiving real data RD and a test data interface TI for receiving test data TD. Additionally, the monitoring and controlling unit 51 comprises an output interface OI for sending updated test data. The monitoring and controlling unit 51 can also comprise respective interfaces (not shown).

FIG. 2 illustrates a flow chart comprising the method steps according to the invention. As previously explained, the first monitoring and controlling unit 51 comprises at least three interfaces for receiving and sending data sets. The test data interface receives pre-defined set of test data TD in a first step S1. Further, the real data interface receives real data RD collected by the monitoring and controlling unit of the physical unit PU S2. The two data sets TD, RD are compared in a further step S3. If a part of new data is identified, the test data TD is updated with the part of new data. The output interface sends the updated test data in a last step S4. This updated test data can be further processed into respective executable tests (not shown).

In summary, the combination of worst-case testing in the engineering phase and the continuous extension of the test data with real world data in the present embodiment allows to continuously monitor the correct behavior of an autonomous system and its elements and to extend the existing test base by continuously adding realistic data sets.

As previously explained, each autonomous means comprises a respective monitoring and controlling unit 51, 52. Additionally or alternatively, the autonomous means comprise other distinct or equal system components. Thereby, the monitoring and controlling unit 52 of the physical unit PU receives and records the pairs of input and output data and sends them to the monitoring and controlling unit 51 of the test agent TA. In particular, the monitoring and controlling unit 51 of the test agent TA has a Test Data Evaluator which compares the previous input-output data pairs with the new input-output data pairs from the real world. If any new input-output data pairs are detected, they are further transmitted to the Data Generator 20 of the test agent TA. The Data Generator 20 updates the data model (dynamic classification tree) and generates the possible test data combinations. The test data combinations are transmitted from the Data Generator 20 to the Test Script Generator 30. The Test Script Generator 30 generates executable tests 30, as explained above. Importantly, the newly recorded output data is considered as expected results, as well. The more data is collected, the more precise the expected results will be.

According to an embodiment, an exemplary product or field of application would be an autonomous car. The physical unit PU might be an autonomous car driving on the highway and responding to speed or distance restrictions considering its environmental conditions. Another field of application might be smart devices like robots, conveyors or CNC machines in smart production plants. Robots for example would be able to adjust their speed and position depending on the tasks they fulfill or to redirect a working piece to another device according to the current production workflow. The first and second autonomous means TA, PU are synchronized and can communicate with each other for the exchange and extension of test data.

Various input parameters, such as e.g. occurrences or events of the autonomous car or external environmental conditions, have to be considered for the generation of test data and further self-testing of the autonomous car. For example, failures of brakes, people on the highway or distance to next cars on the highway should be considered in the virtual world for the generation of reliable test data. However, in the virtual world the autonomous car and its behavior or reactions are unknown and can be merely expected or covered completely. Thus, the expected input parameters and behavior might change in the real world. For example, if the distance between two cars is below a certain threshold, the autonomous car should slow down in the real world. Thus, the input parameters and/or behavior are monitored in the real-world during operation and the previously assumed test data is updated with the real data. Accordingly, the test data can be extended or corrected continuously. It should be noted that the present embodiment is also applicable on any other product or technical field, such as Robotics or Process Automation. In the case that the autonomous means PU comprises a self-x tester, the autonomous car is also suitable for self-testing during an idle mode i.e. red traffic light or parking.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A monitoring and controlling hardware unit for use in a virtual world of an autonomous system with self-X properties including self-testing, the monitoring and controlling hardware unit comprising:
   a processor, the processor configured to:
   a. receive test data from the virtual world, wherein the test data is generated during an engineering phase;
   b. receive real data from a real world, wherein the real data from the real world is collected during an operational phase;
   c. compare the test data with the real data from the real world to determine whether there is a part of new data in the real data, and automatically update the test data with the new data, if the part of new data is identified in the real data from the real world; and
   d. output the updated test data, wherein the updated test data is automatically processed by a test script generator into at least one executable test for self-testing the autonomous system with self-X properties, wherein the processor further configured to:

generate a combination of the test data based on a pre-defined input data space, wherein the pre-defined input data space is stored as adaptive classification trees, wherein the adaptive classification trees comprise a fixed part and adaptive part, wherein the fixed part is defined in the engineering phase and the adaptive part presents current configuration of a set of data provided by the self-X properties and evaluated by the monitoring and controlling hardware unit.

2. The monitoring and controlling hardware unit according to claim 1, wherein the test data is based on at least one external or internal input parameter, wherein the at least one input parameter is selected from a group, comprising: system environment, system requirement, system status, system component, interaction of system components.

3. An autonomous system with self-X properties including self-testing, comprising:

a first autonomous device, the first autonomous device having a first monitoring and controlling hardware unit for use in a virtual world of the autonomous system, wherein the first monitoring and controlling hardware unit is configured to:

a. receive test data from the virtual world, wherein the test data is generated during an engineering phase;

b. receive real data from a real world, wherein the real data from the real world is collected during an operational phase;

c. compare the test data with the real data from the real world to determine whether there is a part of new data in the real data from the real world, and automatically update the test data with the new data, if the part of new data is identified in the real data from the real world; and d. output the updated test data, wherein the updated test data is automatically processed by a test script generator into at least one executable test for self-testing the autonomous system with self-X properties, wherein the first monitoring and controlling hardware unit is further configured to:

generate a combination of the test data based on a pre-defined input data space, wherein the pre-defined input data space is stored as adaptive classification trees, wherein the adaptive classification trees comprise a fixed part and adaptive part, wherein the fixed part is defined in the engineering phase and the adaptive part presents current configuration of a set of data provided by the self-X properties and evaluated by the first monitoring and controlling hardware unit.

4. The autonomous system with self-X properties according to claim 3, further comprising:

a second autonomous device in the real world with a second monitoring and controlling hardware unit for collecting the real data and for sending the real data to the first autonomous device in the virtual world.

5. The autonomous system with self-X properties according to claim 4, wherein the first autonomous device in the virtual world is a digital virtual representative and the second autonomous device is a physical unit in the real world, wherein the first autonomous device is fully synchronized with the second autonomous device.

6. The autonomous system with self-X properties according to claim 4, wherein the first autonomous device and the second autonomous device are connected by a communication channel for exchanging the test data and/or the real data.

7. The autonomous system with self-X properties according to claim 3, wherein the first autonomous device further comprises at least one processing unit suitable for the generation of dynamic classification trees.

8. The autonomous system with self-X properties according to claim 3, wherein the first autonomous device further comprises a deviation report for reporting at least one deviation in the autonomous system, wherein the at least one deviation is detected if a part of the new data is identified by the first monitoring and controlling hardware unit.

9. The autonomous system with self-X properties according to claim 4, wherein the second autonomous device further comprises a built-in self-x tester for executing self-testing of the autonomous system.

10. A method of self-testing of an autonomous system with self-X properties, comprising the steps of:

a. receiving test data from a virtual world by a test data interface of a first monitoring and controlling hardware unit, wherein the test data is generated during an engineering phase;

b. receiving real data from a real world by a real data interface of the first monitoring and controlling hardware unit, wherein the real data is collected during an operational phase;

c. comparing the test data with the real data to determine whether there is a part of new data in the real data by the first monitoring and controlling hardware unit, and automatically updating the test data with the new data, if the part of new data is identified in the real data;

d. sending the updated test data by an output interface of the first monitoring and controlling hardware unit, wherein the updated test data is automatically processed by a test script generator into at least one executable test for self-testing of the autonomous system with self-X properties, wherein the method of self-testing of an autonomous system with self-X properties further comprising:

generating a combination of the test data based on a pre-defined input data space, wherein the pre-defined input data space is stored as adaptive classification trees, wherein the adaptive classification trees comprise a fixed part and adaptive part, wherein the fixed part is defined in the engineering phase and the adaptive part presents current configuration of a set of data provided by the self-X properties and evaluated by the first monitoring and controlling hardware unit.

* * * * *